April 3, 1928. 1,664,740
J. A. DOANE
AUTOMATIC MULTIPLE SPINDLE MILLING LATHE
Original Filed Aug. 23, 1921 9 Sheets-Sheet 3

April 3, 1928. 1,664,740
J. A. DOANE
AUTOMATIC MULTIPLE SPINDLE MILLING LATHE
Original Filed Aug. 23, 1921 9 Sheets-Sheet 6

*Fig. 6.*

Inventor
J. A. Doane.
By Joseph K. Schofield
Attorney.

April 3, 1928. 1,664,740
J. A. DOANE
AUTOMATIC MULTIPLE SPINDLE MILLING LATHE
Original Filed Aug. 23, 1921 9 Sheets-Sheet 9

Inventor
J. A. Doane.
By Joseph A. Schofield
Attorney.

Patented Apr. 3, 1928.

1,664,740

UNITED STATES PATENT OFFICE.

JOHN A. DOANE, OF HARTFORD, CONNECTICUT, ASSIGNOR TO PRATT & WHITNEY COMPANY, OF NEW YORK, N. Y., A CORPORATION OF NEW JERSEY.

AUTOMATIC MULTIPLE-SPINDLE MILLING LATHE.

Application filed August 23, 1921, Serial No. 494,680. Renewed September 13, 1927.

This invention relates to a milling lathe and in particular to a screw thread milling lathe having a plurality of work holding spindles.

An object of the invention is to provide a milling lathe of the multiple spindle type having a rotatable turret in which a plurality of parallel spindles is provided, each of which is adapted to hold work mounted on one end upon which a contour such as a screw thread may be formed. A suitable milling cutter or hob is mounted adjacent one of the spindles and is moved into and out of work engaging position between each index movement of the turret.

Another feature which is advantageous is that the work secured at one end of the spindles may be supported at its extended or free end by separate centers or other supports which rotate with the turret about its horizontal axis so that the work is always supported and held parallel with the turret axis for operation thereon by the milling cutter.

Another object is to rotate the work holding spindles one and a fraction revolutions while they are in their operative position and, as soon as the turret is indexed, the operative spindle as it moves away from operative position is disconnected from its driving means. Also means are provided to lock the spindles against rotation while they are in their inoperative positions.

A further object of the invention is to provide automatic means for tightening the work in chucks mounted on the spindles previous to its being operated on by the milling cutter, and to provide means for releasing the work from engagement with the chuck after the milling cutter has completed its operation.

A still further object of the invention is to mount the milling cutter eccentrically of the work when in operative position and to provide means for automatically moving the cutter into work engaging position to a predetermined position and to traverse it longitudinally of the axis of the work, the traversing of the cutter parallel with the axis of the work being in timed relation to the rotation of the work holding spindle.

Another object of the invention is to mount the milling cutter on a pair of slides movable at right angles to each other, the milling cutter being automatically moved into its work engaging position by movement of one slide and moved longitudinally of the work spindles by movement of the other slide.

Another object of the invention is to move both slides on which the cutter is mounted in timed relation to each other and in timed relation to the rotation of the turret and spindles.

A still further object of the invention is to provide manual adjusting means for the milling cutter on one of the slides, preferably, these means permitting a rapid movement of the cutter toward or away from work engaging position to predetermined positions and also permitting a slow adjustment into or out of work engagement.

With these and other objects in view, my invention consists in the features of construction and operation set forth in the following specification and illustrated in the accompanying drawings.

In the accompanying drawings annexed hereto and forming a part of this specification, I have shown my invention embodied in a screw thread milling lathe but it will be understood that the invention can be otherwise embodied and that the drawings are not to be construed as defining or limiting the scope of the invention, the claims appended to this specification being relied upon for that purpose.

In the above mentioned drawings I have shown but one modification of the invention which is now deemed preferable but it is to be understood that changes and modifications may be made within the scope of the apended claims without departing from the spirit of the invention.

Briefly, my invention in its broadest aspect comprises the following principal parts: first, a base; second, a turret thereon rotatably mounted about a horizontal axis; third, a plurality of work spindles rotatably mounted in said turret and symmetrically disposed about the axis of the turret; fourth, means to rotate each of said spindles when it is in operative position relative to a cutter; fifth, a chuck on the forward end of each of the work spindles; sixth, means to automatically open and close said chucks; seventh, supports for the outer ends of work mounted in said chucks; eighth, a milling cutter mounted upon an axis parallel with the work spindles; ninth, a pair of slides upon which the milling cutter is supported, these slides being movable respectively longitudinally and transversely of the work spindle axis; tenth, rotating means for the cutter; means to move said slides, one of said slides being movable in timed relation to the rotation of the work spindle.

Referring more particularly to the figures of the drawings, the base of the machine is shown at 10, which at one end is provided with a headstock 11 in which is mounted a rotatable turret 12. The turret 12 is mounted in horizontal bearings 13 and 14 provided in the headstock 11 and is provided with four horizontally mounted work holding spindles 15 spaced equally from the turret axis and from each other. Each of these spindles 15 is rotatably mounted in bearings 16 and 17. Each of these spindles 15 extends the entire length of the turret 12 and protrudes from its end faces. Each of the spindles 15 has mounted thereon a gear 20 by means of which it is rotated when the spindle 15 is in its operative position or station. The driving connections for gear 20 will be presently described. On the forward end of each of the work holding spindles 15 is a collet chuck 25 adapted to engage work inserted in the spindle. The chucks 25 may be controlled manually by means of a hand wheel 26 to close the jaws of the chuck 25 or they may be tightened and loosened automatically by means provided in the machine.

Preferably, I use pneumatic means to close the chucks 25 and engagement of the spindle 15 by a pawl mounted adjacent the operative position of the spindles to open them as soon as operation on work mounted in the spindle is completed. These means will now be described together with the spindle locking means.

Figure 1:
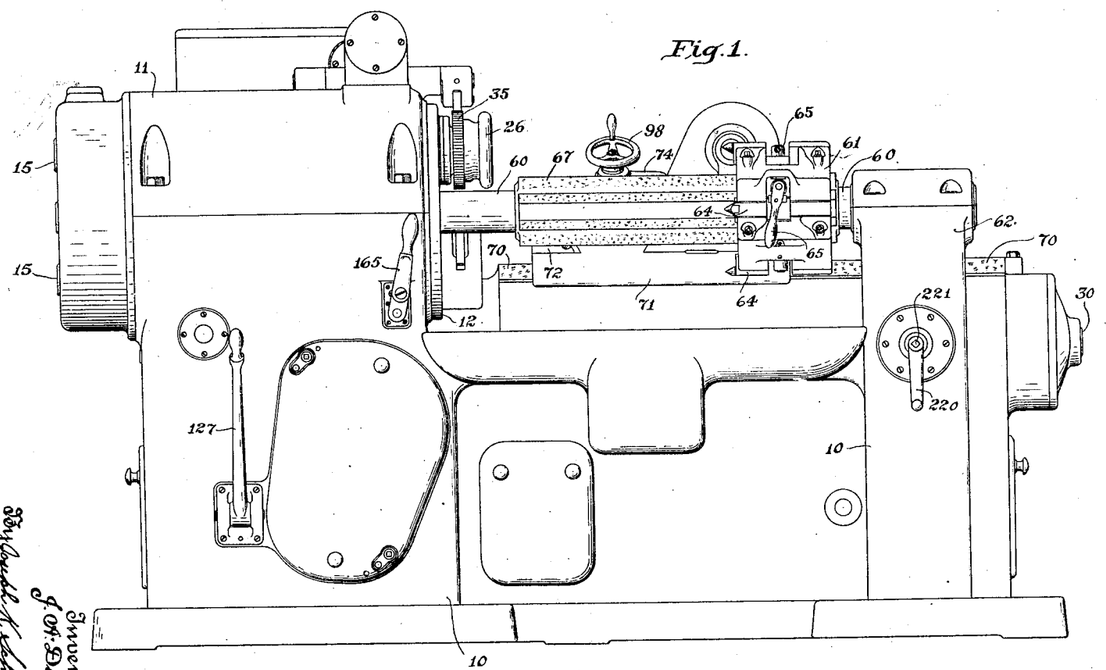
Figure 1 is a longitudinal outside view in elevation of the complete machine.
Figures 2, 14:
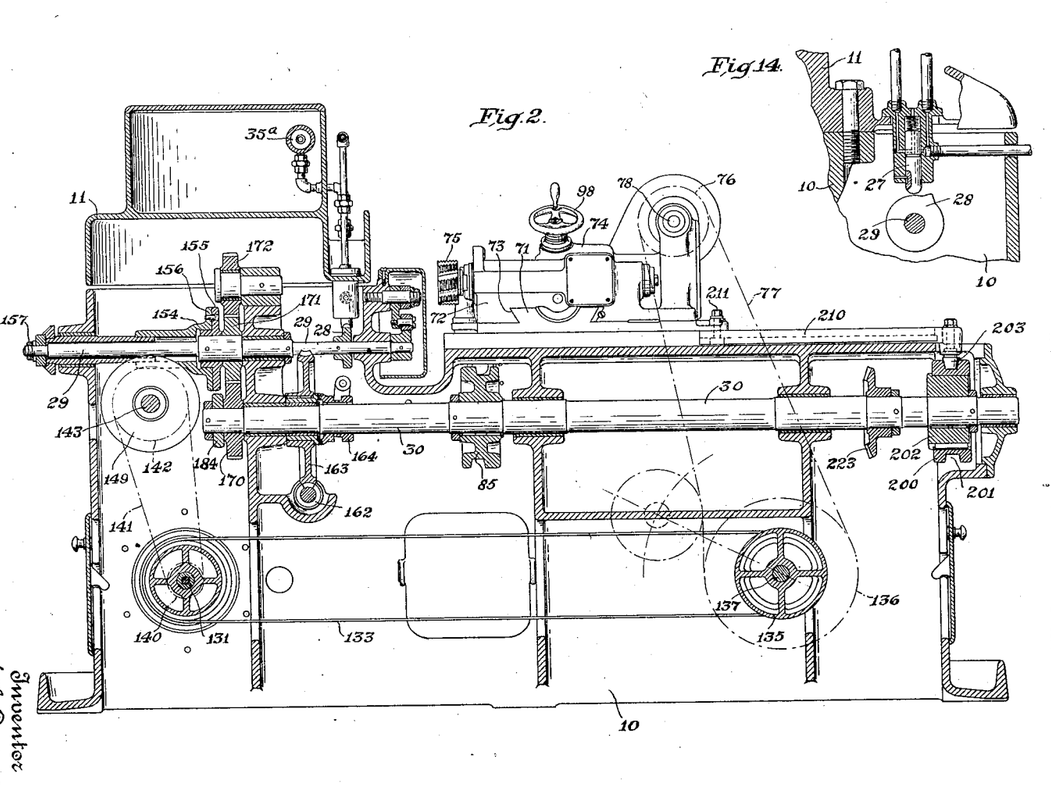
Fig. 2 is a longitudinal view of the machine in section showing part of the driving and operating mechanisms.
Fig. 14 is a detail view of the valve and controlling cam for the pneumatic chuck closing mechanism.
Figure 7:
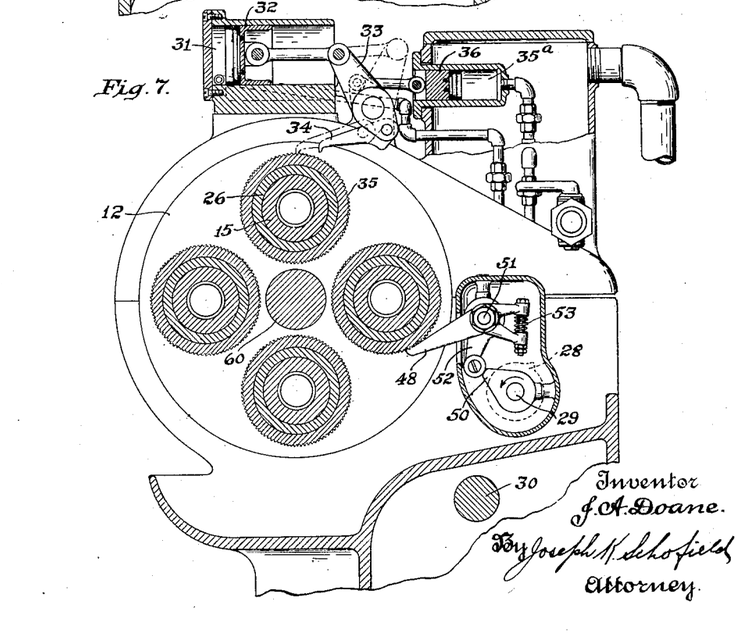
Fig. 7 is a transverse elevation showing the chuck operating mechanisms, this section being taken on line 7—7 of Fig. 3.

The means for operating the chucks 25 comprise two distinct mechanisms, as shown in Fig. 7, which are operated independently of each other. One of these means is adapted only to tighten the chuck 25 before its spindle is brought into operative position and the other mechanism is adapted to loosen it after the work has been engaged by the cutter and operation thereon completed. By means of a valve 27, see Fig. 14, opened and closed by a cam 28 on a shaft 29 lying adjacent the turret 12 and operated from a main cam shaft 30, compressed air or other fluid is admitted to a cylinder 31 which, through a piston 32 and levers 33 pivoted about a short shaft, moves the pawl 34 through an arc of about 10 or 15°. This pawl 34 contacts with the upper portion of a ratchet wheel 35 mounted on the chuck closing member 26 so that when air is admitted to the cylinder 31, this pawl 34 is given a quick powerful movement which rotates the ratchet wheel 35 and tightly closes the chuck 25 and holds the work rigidly in position.

Adjacent this cylinder 31 is another smaller cylinder 35ª having a piston 36 attached through a connecting rod and lever to the same shaft as pawl 34. This cylinder 35ª is preferably connected directly with the supply of fluid under pressure so that it at all times tends to force the pawl 34 to its rearmost position. This constant backward pressure is overcome as soon as the larger cylinder 31 is filled with fluid and the pawl 34 advanced. Also, as soon as the larger cylinder 31 is exhausted of fluid by downward movement of the valve 27, the pawl 34 is returned to its rearward position by the constant pressure exerted against piston 36. The position of the cam 28 on shaft 39 is such that the operative movement of pawl 34 occurs while the turret 12 is stationary and, as one revolution of the cam shaft 29 occurs for each index movement of the turret, one closing movement of the pawl 34 occurs when each spindle is in its upper inoperative station.

Figure 6:
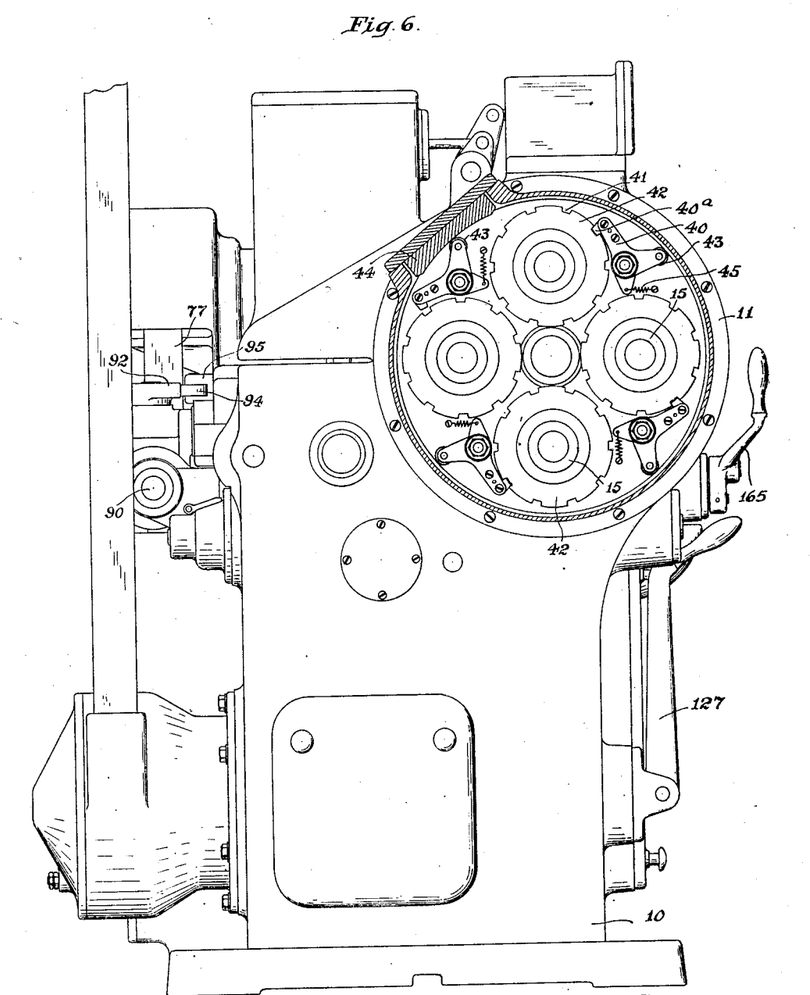
Fig. 6 is a transverse elevation taken on line 6—6 of Fig. 3.

In order to hold the spindles 15 from rotation during the operation of the chuck tightening mechanisms, levers 40, see Fig. 6, are mounted on the turret 12 adjacent the rear end of the spindles 15, these levers having projections 40ª extending into slots or notches 41 cut into circular plates 42 keyed to each of the spindles 15. Normally, these projections 40ª on levers 40 are in engagement with the notches 41 so that the spindles 15 are prevented from rotating. As soon as the turret 12 is indexed so that a spindle 15 is about to be moved to operative position with work held therein adjacent the cutting tool, a roller 43 on an extension of the levers 40 engages an arcuate plate 44 secured to the headstock 11 which oscillates the lever 40 slightly about its pivot and removes its projection 40ª from engagement with a notch 41 in the plates 42. This permits rotation of that spindle. As soon as that spindle 15 has been moved away from its operative or cutter engaging position, the roller 43 runs off the end of the arcuate plate 44 and a spring 45 again forces the projection 40ª into engagement with one of the notches 41. The spindles are therefore held from rotation except when they are in their operative position.

Just before index movement of the turret takes place, the ratchet wheel 35 is engaged by a spring pressed pawl 48 which serves to partially loosen the chuck closing member 26, see Fig. 7. Pawl 48 is normally held out of engagement from the ratchet wheel 35 but is moved into engagement therewith just before rotation of the spindle 15 is completed by a cam 50 also mounted on shaft 29. Preferably, the pawl 48 is formed as a part of a bell-crank lever which may pivot about a short shaft 51. The opposite end of the bell-crank lever is connected to an operating lever 52 through a spring 53 so that, should the pawl 48 take up against the top of the teeth on the ratchet wheel 35, it may oscillate slightly relative to the lever 52.

By the above described means each spindle 15 is held from rotation at each station except the working one, and so the operator may manually adjust and tighten the work to be operated on in the chucks 25 at any of the three inoperative stations during operation of the machine. By means of these chuck operating mechanisms above described, it is only necessary for the operator to position the work within the chucks 25 and close the chuck closing member 26 to an extent sufficient to retain the work in position. The actual tightening of the work within the chucks 25 is accomplished by the pneumatic means described. Also, to remove the work from the chucks, it is only necessary to manually disengage the chuck closing member 26 after it has been partly loosened by the spring pressed pawl 48 above described.

Figure 3:
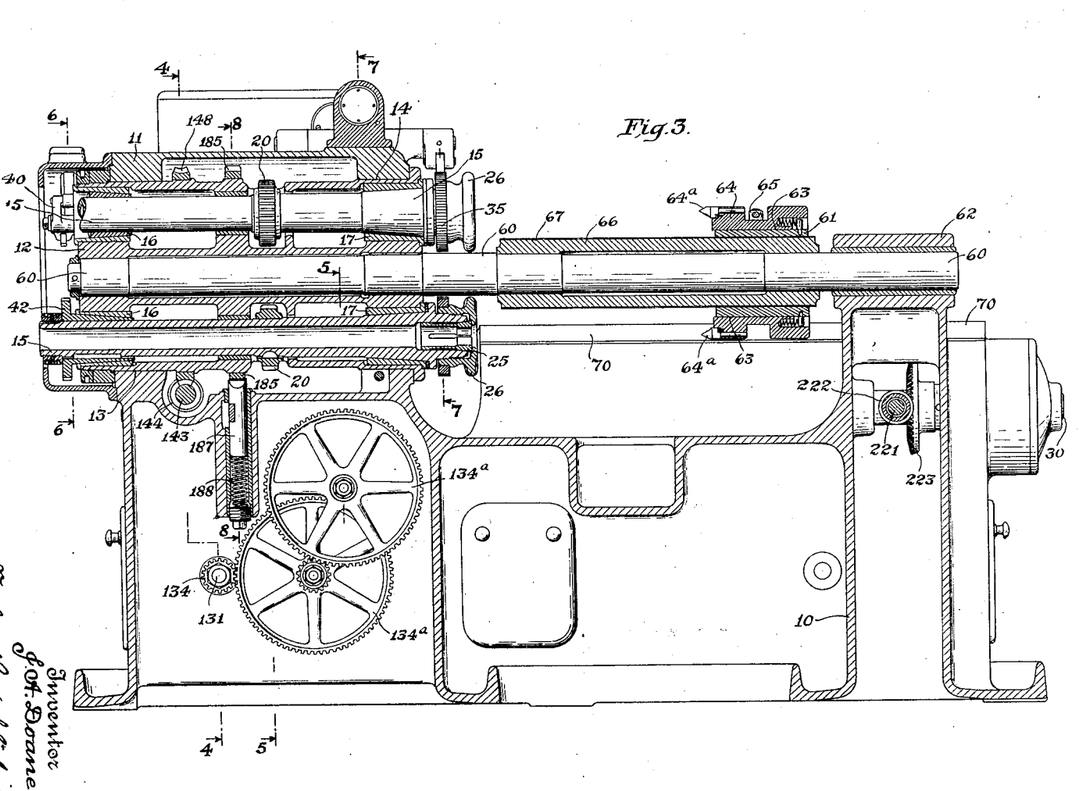
Fig. 3 is a longitudinal view of the machine in section showing the turret spindles and the work supports in section.

In operation upon long work which extends materially from the face of the chucks 25, I preferably use an auxiliary or outer support for the free ends of the work. Extending centrally through and keyed to the turret 12 is a shaft 60 for supporting the tail block 61. This shaft 60 extends longitudinally through the axis of the turret 12 and over the top of the base 10. It is supported at its outer end in a suitable bracket 62 having bearings therein so that this shaft is easily rotatable. On this shaft 60 is mounted the tail block 61 having guide ways 63 in which tailstock plungers 64 may be slidably mounted and clamped in any adjusted position. This tail block 61 has tailstock centers 64ª on each plunger 64 in alignment with the axis of each of the spindles 15 in the turret 12. Movement of these individual centers may be accomplished by handles 65 which also clamp the centers 64ª in position to support the outer or free ends of the work. It will be understood from the above that the shaft 60 and tail block 61 rotate with the index movements of the turret 12 and provide a rigid support for the free ends of long work inserted in the machine and extending materially from the face of the chucks 25. Preferably, the tail block 61 is adjustable toward and from the face of the turret 12 and for that purpose I mount a sleeve 66 on a part of the shaft 60 and fit the tail block 61 to surfaces 67 on said sleeve so that it may slide thereon and be adjustably clamped thereto.

In rear of and slidable along the top of the base 10 is the cutter support comprising the slides 71 and 72. The rotating cutter 75 supported thereon lies adjacent and eccentrically of one of the spindles 15 and with its axis parallel to the axes of these spindles.

The slide 71 is fitted to and slides parallel with the base 10 on guideways 70 provided on the upper surface of base 10. The upper surface of the slide 71 is formed with guideways 73 extending at right angles to the ways 70 on the base 10. On these latter ways 73 is mounted the second slide 72 which may, therefore, move in a direction transverse to the movement of the first slide 71. On the second or transverse slide 72 is formed the cutter head 74 which rotatably supports a rotating cutter 75, the form shown in the drawings being a screw thread milling hob.

To rotate this cutter 75, I provide a pulley 76 on the cutter head 74 which may be driven by driving belt 77 from any convenient driving means such as a pulley within the base 10 of the machine. Pulley 76 is mounted at one end of a short shaft 78 having a worm 78ª formed thereon near the opposite end in engagement with a worm wheel 79. Worm wheel 79 is fastened to a shaft 80 which lies parallel to a cutter shaft 81, which is driven therefrom by suitable spur gearing 82. On the end of shaft 81 a cutter 75 of any desired type is adapted to be fastened.

Figure 10:
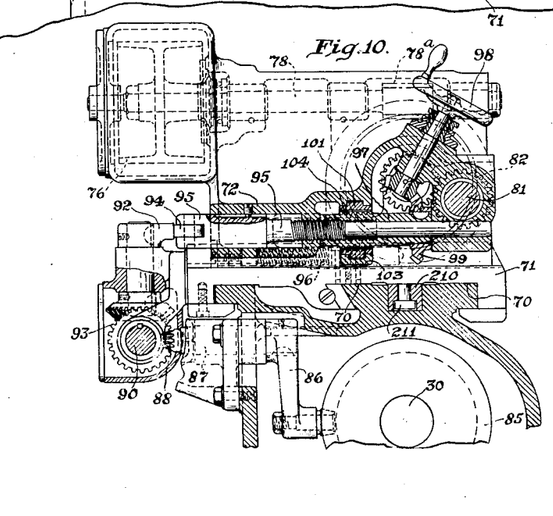
Fig. 10 is a transverse sectional view in elevation of the cutter slides and head.
Figure 11:
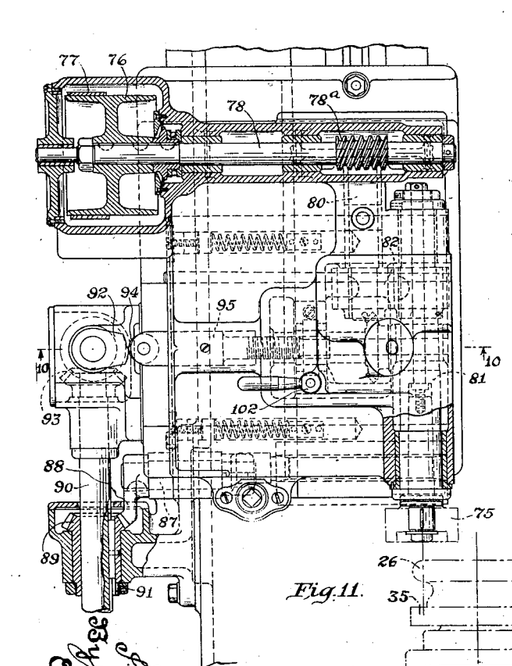
Fig. 11 is a plan view of the cutter slides and head, parts being shown in section.
Figure 12:
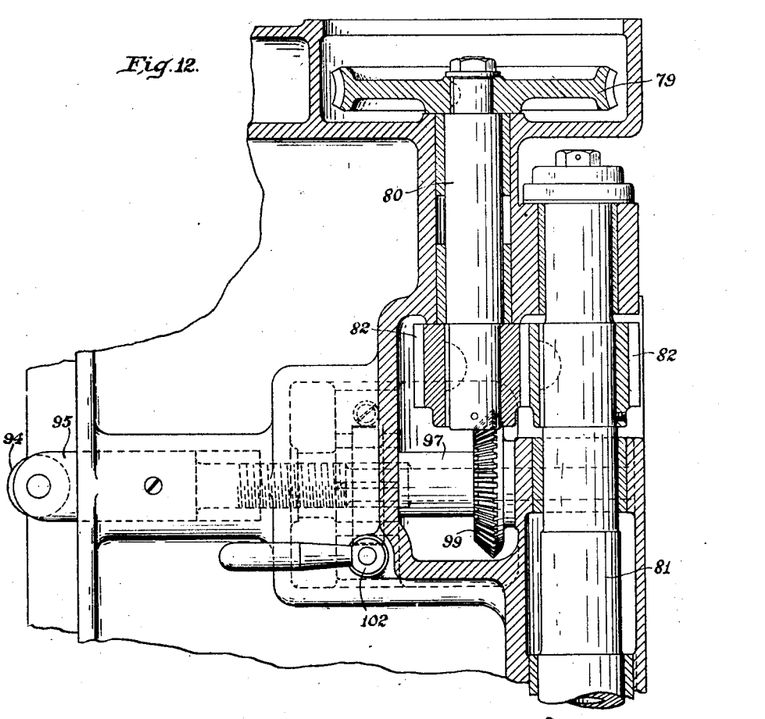
Fig. 12 is an enlarged view of a part of the construction shown in Fig. 11.

The cutter head 74 with its slide 72 is moved toward and from the axis of the operative station of the spindles 15 by the following mechanism: Engaging a cam 85 on the main cam shaft 30, the driving means for which will presently be described, is a lever 86 mounted on a short horizontal shaft 87. On the opposite end of shaft 87 is a segmental gear 88 which meshes with gear 89 splined to a longitudinal shaft 90. A collar 91 on the sleeve of gear 89 retains this gear in mesh with segmental gear 88, the gear 89 being also supported in a suitable bracket secured to the base 10. The shaft 90, which is oscillated through a small angle by the gears 88 and 89 and cam 85 above described, oscillates a cam 92 operatively mounted on the rear of slide 71 through a pair of bevel gears 93. One of the bevel gears 93 is splined to shaft 90 so that it may slide along shaft 90 with movement of the slide 71. Cam 92 bears against a roller 94 on the rear end of a rod 95 mounted in the cutter head 74 on slide 72 so that this head 74 with the rod 95 is forced forward and rearward at each oscillation of the cam 92. Springs 96, one of which is shown in Fig. 10, resiliently force the cutter head 74 rearward. Automatic forward and rearward movement of the cutter head 74 therefore occurs with each rotation of cam 85 and cam shaft 30.

To manually adjust the forward or rearward position of the cutter head 74 relative to the axis of the spindle 15 for different sizes of work, the rod 95 is threaded as shown in Fig. 10. Surrounding the threaded portion of rod 95 is a nut 97 which may be rotated by hand wheel 98 through bevel gears 99. This nut 97 is held between abutments within the cutter head 74 so that movement of the nut 97 along rod 95 adjusts the position of the head 74 and the cutter 75. Adjustment of the position of the cutter head 74 for different sizes of work in the spindles 15 is thus made by manually rotating the nut 97 by hand wheel 98. Movement of the head 74 by the cam 92 is used to move it so that the cutter 75 will be moved into and out of engagement with the work at each index movement of the turret 12, the movement out of engagement with the work occurring during the index movement of the turret and the movement into work engaging position after the index movement is completed.

Figure 13:
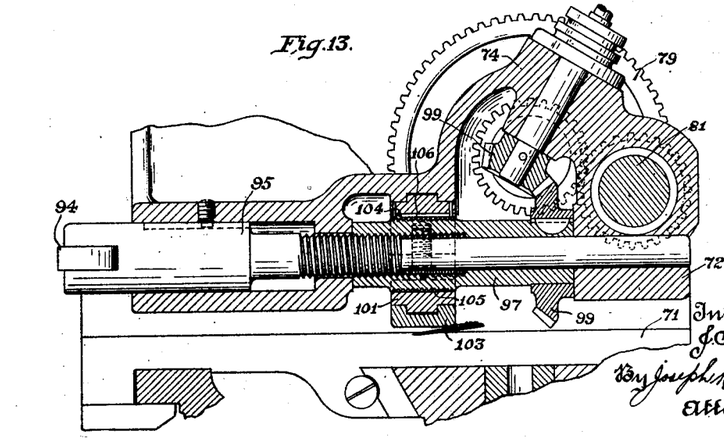
Fig. 13 is an enlarged view of a part of the construction shown in Fig. 10.

It is desirable that means be provided supplementally to the above cutter adjusting means to move the cutter head 74 a material distance away from its work engaging position and, when moved back again into its forward work engaging position to preserve the previous adjustment of the cutter 75. To accomplish this I provide a sleeve 101 surrounding the nut 97. This is clearly shown in Fig. 13. This sleeve 101 may be clamped in position by clamping screw 102 operating a strap 103 surrounding the sleeve 101. When this strap 103 is loosened so that the sleeve 101 may rotate freely, adjustment of the head 74 may be made over a wide range by rotating nut 97 as much as desired. During this adjustment, which may be made to preliminarily position work in the machine, the sleeve 101 rotates with the nut 97. With the sleeve 101 clamped by means of the strap 103, the head 74 may be adjusted only far enough to traverse a small ball 104 from one end to the other of a screw thread 105 on the outer surface of nut 97. This is accomplished by rotating the nut 97 within the sleeve 101 which is held from rotating by the strap 103. A spline 106 is formed in sleeve 101 along which the ball 104 may move as it is traversed along the thread 105. Abutments on thread 105 and spline 106 stop the rotation of nut 97 at definite forward and rearward positions. The nut 97 may therefore be rotated by the gear 99 only far enough to permit the ball 104 to roll from one end of the threaded groove 105.

To move the slide 71 and cutter 75 longitudinally along the bed or base 10 in timed relation with the rotation of the work mounted on the spindles 15, and while the cutter is in work engaging position, I mount a cam 200 near one end of the main cam shaft 30 and connect this cam with the lower slide 71 by suitable means. In this way the cutter 75 is given a motion corresponding to the shape of the groove within the cam 200 which may be so formed that it will move the slide 71 in any predetermined manner. The cam 200 is preferably made removable from the main cam shaft 30 so that cams having different forms of peripheral grooves 201 may be substituted which will give the slide 71 and cutter 75 a different longitudinal movement for one revolution of the cutter spindle 15. For this purpose, I fasten a sleeve 202 to the main cam shaft 30 and fasten the cam 200 over it. The adjustment of the cam 200 is such that the movement to the left of the cutter 75, as viewed in Fig. 2, will occur while the cutter 75 is in work engaging position and movement to the right to return the cutter 75 to its initial position will occur while the cutter is out of operative position. To connect the slide 71 with the cam 200, I provide the rod 210 extending along the upper surface of the base 10 which is connected to the cam groove 201 by a roller 203. Preferably, the rod 210 operates in a depression provided therefor, the rod being adjustably fastened to the longitudinally movable slide 71 in any position by clamping screw 211.

Figure 4:
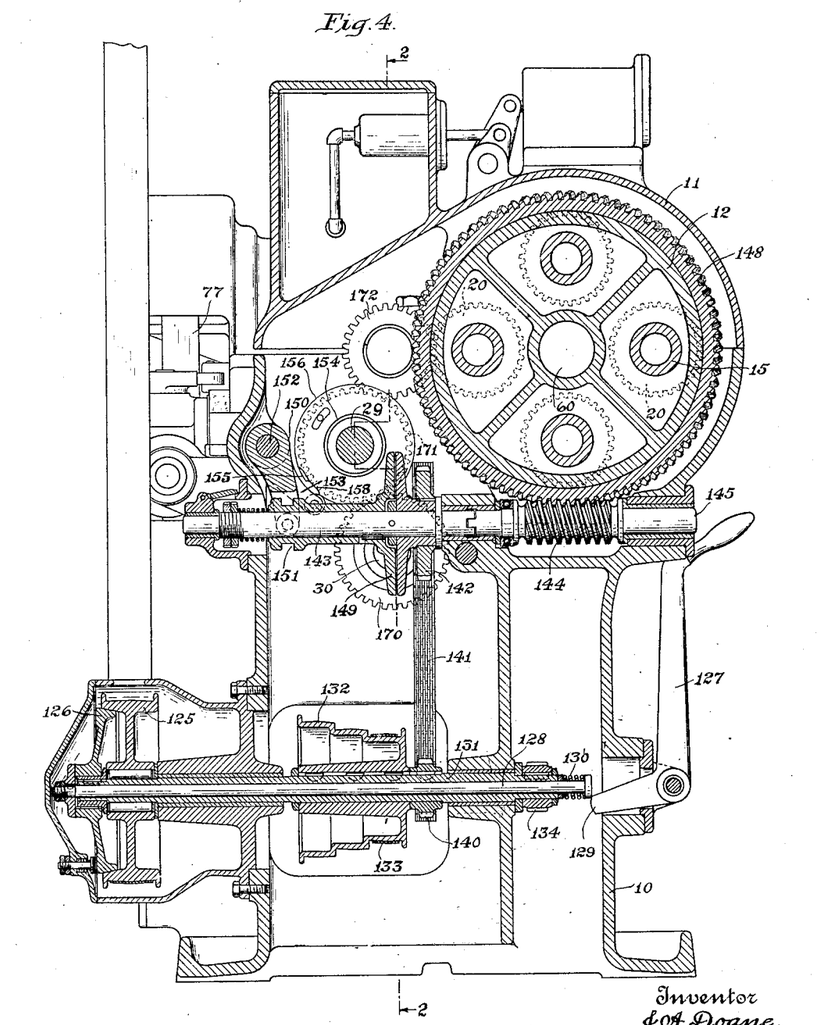
Fig. 4 is a transverse elevation in section taken on line 4—4 of Fig. 3.

The main drive of the machine is accomplished by means of a belt pulley 125 which may be driven from any convenient source of power, see Fig. 4. Adjacent the main driving pulley is a friction driving clutch 126 which may be thrown into or out of engagement with the conical clutch surface on the pulley 125 by means of a lever 127. Normally the clutch 126 is held in operative position by a spring 130 and is moved out of operative position by the lever 127 which moves a rod 128 to which the friction driving clutch 126 is fastened. As shown in the drawings, the lever 127 has an extension 129, the end of which is shaped to fit against and move the rod 128 to which the clutch 126 is fastened. When the lever 127 is moved to a vertical position, the rod 128 will be moved to the right by spring 130 to engage clutch 126 and when the lever 127 is depressed, the rod 128 is moved to the left to disengage the clutch. With the clutch 126 in driving connection with the pulley 125, the main driving shaft 131 is rotated which rotates a cone pulley 132 having three or more steps on which a belt 133 may run to rotate the cutter 75. A pinion 134 is mounted on the shaft 131 for operating the spindles 15 and the main cam shaft 30. Between the cone pulley and pinion 134 is the small sprocket wheel 140 which forms the driving means for the turret 12. The cone pulley 132 on driving shaft 131 is connected by a belt 133 with a cone pulley 135 mounted on a transverse shaft 137 within the base 10 which has a single pulley 136 mounted thereon over which may be placed the belt 77 previously referred to for driving the milling cutter 75. This may be operated at different speeds by shifting the belt 77 to any one of the steps on the cone pulleys 132 and 135.

Figure 5:
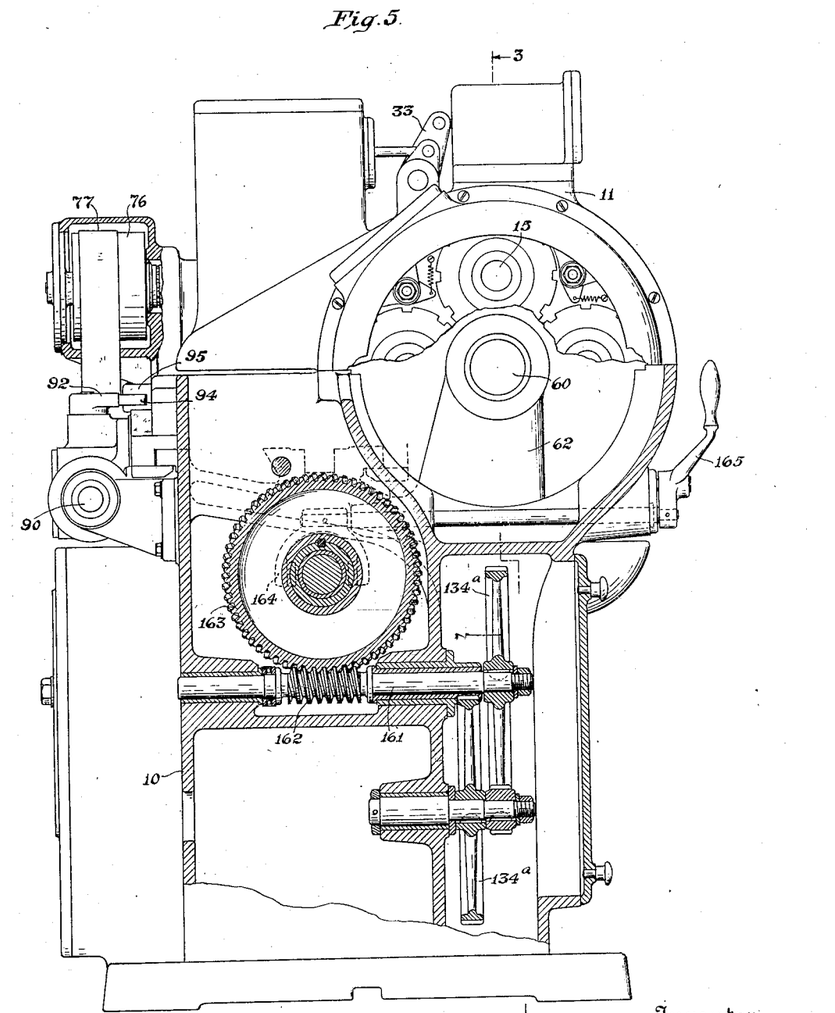
Fig. 5 is a transverse elevation taken on line 5—5 of Fig. 3.

Cam shaft 30 previously referred to as having cams thereon for moving the tool supporting slides 71 and 72, has also a cam for controlling the locking and unlocking of the turret 12. This shaft extends longitudinally of the base throughout the major part of the length of the base. To rotate this main cam shaft 30, I mount the small gear 134 on a main driving shaft 131, see Figs. 3 and 4. This, through suitable reduction gearing 134ª, some of the members of which may be readily changed to effect changes in speed, drives the cam shaft 30 at speeds which may be varied so that the speed ratio between driving shaft 131 and cam shaft 30 may be conveniently changed. Connected to the gearing is a transverse shaft 161, see Fig. 5, on which a worm 162 is mounted. This worm 162 is in mesh with a worm wheel 163 adapted to be placed in driving connection with the main cam shaft 30. Preferably, the worm wheel 163 is not directly fastened to the shaft but may be placed in driving connection therewith by means of a clutch member 164 splined to the shaft 30 and operated from a handle 165 extending from the forward surface of the bed. One revolution of this cam shaft 30 completes a cycle of operations of the machine and all cams are operated from and in timed relation to the revolution of this cam shaft 30.

To manually rotate the cam shaft 30 during preliminary adjustment of the machine, a crank 220 is provided on a short shaft 221 having a bevel gear 222 on its inner end. Gear 222 is in mesh with a bevel gear 223 keyed to cam shaft 30.

Rotation of the work spindles 15 is also obtained from rotation of the cam shaft 30. On this main cam shaft 30 is a gear 170 in mesh with an intermediate gear 171 which, through gear 172 drives the gears 20 keyed to each of the work holding spindles 15. As shown in the drawings, this driving gear 172 for the gears 20 on the spindles 15 is mounted so that when each of the spindles 15 is in its operative position, the gear 20 on that spindle 15 is in driving engagement therewith and, as soon as the index movement of the turret occurs, the gear 20 is disengaged. Also, for a purpose presently to be described, the ratio between gears 170 and 20 is such that the spindles 15 are rotated slightly more than one revolution for each revolution of the cam shaft 30.

Rotation of the main cam shaft 30 rotates the cams 85 and 200 which effect the operation of the slides 71 and 72 on which the cutter 75 is mounted. The operation of these cams 85 and 200 to advance the cutter into and out of operative engagement with the work and to move the cutter 75 longitudinally of the work have previously been described. These cams are so timed relatively to each other that the cutter is first advanced into operative position and then moved longitudinally of the work, after which it is moved out of operative position and returned to its initial position.

The sprocket wheel 140 on the driving shaft 131 drives a chain 141 running over a sprocket 142 mounted on an intermediate transverse shaft 143. In alignment with this shaft 143 is a worm 144 on a short shaft 145 suitably clutched to the end of shaft 143. Worm 144 is in mesh with a worm wheel 148 mounted on the turret 12. Also on the intermediate shaft 143 is a friction clutch 149 for connecting the sprocket wheel 142 in driving connection with the worm 144. As shown in the drawings, the sprocket wheel 142 is mounted on a member forming one member of the friction clutch 149 which is rotatably mounted on the shaft. The companion member of the friction clutch 149 which is keyed to the shaft 143 is adapted to be moved into or out of engagement with the sprocket member 142 by means of a lever 150 engaging an annular groove 151 on the clutch member 149. With the friction clutch 149 in driving engagement, the worm 144 is frictionally driven with sufficient power to readily rotate the turret 12 during its index motion to position the spindles 15 individually in operative position.

The lever 150 by means of which the clutch 149 is opened and closed is mounted on a short shaft 152 having a lever 153 bearing against a cam 154. The cam 154 is attached to and rotatable with shaft 29 so that the clutch 149 is opened and closed in timed relation with the rotation of the main cam shaft 30.

Figure 8:
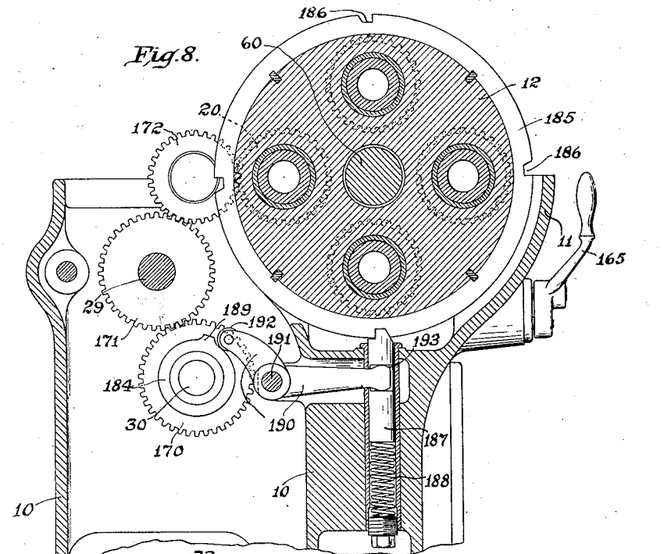
Fig. 8 is a transverse elevation showing the turret locking means taken on line 8—8 of Fig. 3.
Figure 9:
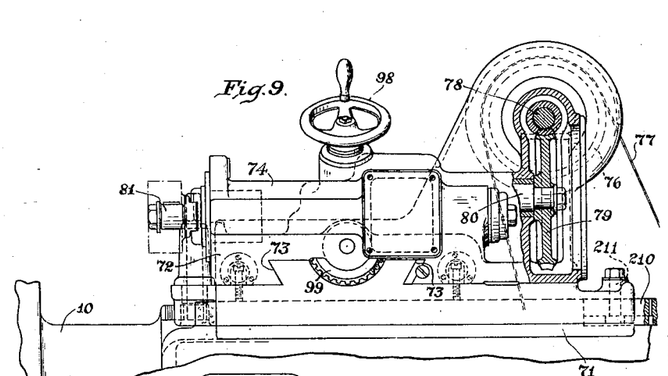
Fig. 9 is a front elevation partly in section of the tool slides and tool head.

During operation of the cutter on the work, the turret 12 is rigidly locked in position. To lock the turret 12 in position between its indexing movements and to permit rotation during indexing, I mount a ring 185 about the turret 12 which may, preferably, be keyed thereto to hold it from rotation thereon, see Fig. 8. In this ring 185 are notches 186, one being provided adjacent each of the work holding spindles 15. Directly below the center of the turret 12 and in alignment with the notched ring 185 is a locking bolt 187 which is normally held upward by a coil spring 188 so that the locking bolt 187 is urged toward the periphery of the notched ring. The upper end of this locking bolt 187 is so shaped that it fits accurately within the notches 186 in the ring 185 and retains the turret 12 accurately in indexed position. To withdraw the locking bolt 187 from engagement with one of the notches 186 just before the indexing movement of the turret 12 begins, I mount the cam 184 on the end of the main cam shaft 30 having a slight projection 189 on its periphery, see Fig. 8. Riding against this cam is a lever 190 which may oscillate about the stud or shaft 191. This lever 190 at one end is provided with a roller 192 which is held normally in engagement with the cam 184. The opposite end of the lever 190 engages a notch 193 in one side of the locking bolt 187. The coil spring 188, as stated above, normally holds the locking bolt 187 upward and thus holds the roller on the lever in engagement with the cam. As soon as the projection 189 on cam 184 is rotated into a position directly under the roller 192, it oscillates the lever 190 thus withdrawing the locking bolt 187 from a notch 186 and permitting rotation of the turret 12 about its axis by means of the worm 144 and worm wheel 148 previously described. The position of the projection 189 on cam 184 is such that as soon as the turret 12 has started its indexing movement the roller 192 passes over projection 189 and the bolt 187 again presses against the periphery of ring 185. When the adjacent notch 186 is directly above the bolt 187, this bolt 187 may enter the notch, thus stopping the index movement of the turret. The cam 154 is so timed in a manner presently to be described that at the end of this index movement the driving means for turret 12 becomes inoperative through the opening of clutch 149.

The form of cam 154 is such that it normally holds the clutch 149 out of operative connection with shaft 143 and permits clutch 149 to move into operative position only while the turret 12 is being indexed. Should the locking pin 187 enter one of the notches 186 before the clutch 149 disengages, this clutch, however, would slip without damaging any of the parts. The rotary speed of the spindles 15 is variable by means of the gearing 134ª between the pinion 134 and shaft 161 and the speed of the turret index motion is constant. As the clutch 149 is controlled by rotation of cam shaft 29 which is driven from cam shaft 30, means must be provided to hold the clutch closed during a variable amount of revolution of the cam shaft 29 or the clutch 149 may be held in operative position unduly long when the spindles are operating at their slower speeds. For this purpose, I form the cam 154 of two plates placed closely together as shown at 155 and 156 in Fig. 2. The relative positions of these plates may be adjusted and they may be clamped together by means of the nut 157 on the outer end of shaft 29. Each of the plates 155 and 156 is provided with depressions similar to that shown at 158 in Fig. 4. The relative positions of these depressions may be varied so that they overlap each other more or less. As the roller on lever 153 rests on both plates 155 and 156, it may oscillate lever 153 only when it is directly over the depressions in both plates. By increasing the overlapped parts of the depressions the rotative movement of shaft 29 during which the clutch 149 is operating may be widely varied. This adjustment is sufficient so that the actual time during which the clutch 149 is operating may be made to correspond almost exactly with the time taken up by the index movement of the turret 12.

The sequence of operations of this machine is as follows: with the spindles 15 in the turret 12 loaded with work and with the tailstock centers 64ª drawn up into engagement with the free ends of the work, the rotation of the cutter 75 is started by means of the operating lever 127 and the main cam shaft 30 is rotated by operation of the smaller clutch lever 165. This rotates the turret 12 to one of its operative positions or stations and simultaneously one of the locking levers 40 near the head of the machine is released permitting rotation of that particular spindle 15. Just before the spindle 15 is moved into operative position from the preceding inoperative station, the valve 27 controlling the admission of fluid to the cylinder 31 is opened which forces the pawl 34 to rotate the ratchet wheel 35 on the chuck closing member 26 so that the work held by the spindle 15 at the upper station is tightly gripped. As soon as this is completed, the spindle 15 moves to operative position.

Simultaneously with this action of the spindle into operative position, the driving gear 20 on the spindle comes into mesh with the gear 172 so that rotation of the spindle 15 and work beings. By the action of cam 85, the cutter 75 and its support are moved forward by rotation of the main cam shaft 30 and engages the work. As soon as the cutter 75 has extended down to depth and while it is cutting into depth, it is traversed longitudinally along the base 10 during a complete rotation of the spindle 15 a short distance which is exactly equal to the lead of the screw being cut. This longitudinal movement is accomplished by the cam 200 at the outer end of the main cam shaft 30, as above described. As soon as the main cam shaft 30 has made a complete revolution and the spindle has completed slightly more than a complete revolution due to the ratio of the gears 170 and 20 in the driving train, the cutter 75 by means of cam 85 is moved rearward out of engagement with the work and, also, by means of the cam 200 at the outer end of the cam shaft 30, it is moved back to its original position. Simultaneously with this operation, the locking bolt 187 for the turret 12 is disengaged and the friction clutch 149 is engaged so that the turret is indexed to its next position. As seen in Fig. 4, this friction clutch 149 is permitted to be engaged only during a fractional part of the rotation of the cam shaft 29 by means of cam 154. This may be varied by adjustment of the cam plates 155 and 156. As soon as the turret 12 has rotated a short distance, the locking bolt 187 is again raised by its spring 188 and, as soon as the turret 12 has rotated far enough, the bolt 187 slips into the next notch 186 in the periphery of the ring 185. As soon as the turret 12 has completed about one quarter of a revolution, the parts are again in position as at the initial position and the sequence of operations is repeated.

Just before the index movement of the turret 12 starts again, the pawl 48 is moved into operative position and releases the chuck closing member 26 during approximately the last five or six degrees of rotation of the operative spindle 15.

It is to be understood that cam 200 may be dispensed with when the work being milled does not require longitudinal movement of the cutter along the work. In this case, the slide 71 may be fastened in position along the ways 70 of the bed.

What I claim is:

1. A milling machine comprising in combination, a base, a rotatable turret thereon, a plurality of work supporting spindles mounted in said turret, means to rotate each of said spindles when in operative position on said machine, locking means for said spindles, means to unlock said spindles when said spindles are rotated, a milling cutter mounted adjacent one end of said spindles, means to advance said milling cutter into operative position, and means to move said cutter in a direction parallel to said spindles in timed relation to the rotation of said spindles.

2. A milling machine comprising in combination, a base, a rotatable turret thereon, a plurality of work supporting spindles mounted thereon, means to rotate each of said spindles when in operative position on said machine, a milling cutter mounted adjacent one end of said spindles, means to advance said milling cutter into operative position, and cam means operated from the spindle driving means to move said cutter in a direction parallel to said spindles in timed relation to the rotation of said spindles.

3. In a milling machine, the combination of a plurality of rotatable work spindles, a rotatable spindle for a milling cutter, means for effecting relative movement to bring about working relationship between the cutter and each of the work spindles successively, means for rotating the work spindles when in operative position relative to the cutter, and means whereby the rotative movement of each work spindle is discontinued after it has rotated through approximately one revolution.

4. In a milling machine, the combination of a plurality of rotatable work spindles, a rotatable spindle for a milling cutter, means for effecting relative movement to bring about working relationship between the cutter and each of the work spindles successively, means for rotating the work spindles when in operative position relative to the cutter, and means whereby the rotative movement of each work spindle is discontinued after it has rotated through slightly more than one revolution.

5. In a milling machine, the combination of a plurality of rotatable work spindles, a rotatable spindle for a thread milling cutter, means for effecting relative movement to bring about working relationship between the cutter and each of the spindles successively, means for rotating the work spindles when in operative position relative to the cutter, means for relatively moving said cutter and work spindles axially of the operative work spindle in timed relation to each other, and means whereby the rotative movement of each spindle is discontinued after it has rotated through approximately one revolution.

6. In a milling machine, the combination of a work spindle, a rotatable spindle for a thread milling cutter, means for rotating the work spindle, means for effecting a relative longitudinal feeding movement between the spindles during slightly more than one revolution of the work spindle, and two means acting immediately after the feeding movement, one for discontinuing the rotation of the work spindle and the other for quickly effecting a relative longitudinal returning movement of the cutter to its initial position.

7. In a milling machine, the combination of a work spindle, a rotatable spindle for a thread milling cutter, means for rotating the work spindle, a cam for effecting a relative longitudinal feeding movement between the spindles during slightly more than one revolution of the work spindle, and two means acting immediately after the feeding movement, one for discontinuing the rotation of the work spindle, the other for quickly effecting a relative longitudinal returning movement to its initial position.

8. In a milling machine, the combination of a work spindle, a rotatable spindle for a thread milling cutter, means for rotating the work spindle, a cam for effecting a relative longitudinal feeding movement between the spindles during slightly more than one revolution of the work spindle, means to move said cutter spindle toward and away from said work spindle, and two means acting immediately after the feeding movement, one for discontinuing the rotation of the work spindle and the other for quickly effecting a relative longitudinal returning movement to its initial position.

9. A milling machine comprising in combination, a base, a rotatable turret thereon, a plurality of work supporting spindles mounted in said turret, a tail block rotatable with said turret, and adjustable toward and from said turret, tail-stock plungers in said tail block to support the outer ends of work in said spindles, means to rotate each of said spindles when in operative position on said machine, a milling cutter mounted adjacent one end of said spindles, and means to move said cutter in a direction parallel to said spindles in timed relation to the rotation of said spindles.

10. A multiple spindle milling machine comprising in combination, a base, a rotatable turret thereon, a plurality of parallel work holding spindles rotatably mounted therein, chucks on the forward ends of said spindles, pneumatically operated means to tighten said chucks, and mechanically operated means to loosen said chucks.

11. A multiple spindle milling machine comprising in combination, a base, a rotatable turret thereon, a plurality of parallel work holding spindles rotatably mounted therein, means to lock said spindles against rotation, chucks on the forward ends of the spindles, and automatically operated means comprising a pneumatically operated pawl engaging ratchet wheels on said spindles to tighten said chucks when said locking means for said spindles are in engagement.

12. A multiple spindle milling machine comprising in combination, a base, a rotatable turret thereon, a plurality of parallel work holding spindles rotatably mounted therein, means to rotate each of said spindles when in operative position on said machine, means to lock said spindles against rotation when in their inoperative positions, chucks on the forward ends of said spindles, and automatically operated means to tighten said chucks when said spindles are in one of their inoperative positions and when the locking means for said spindles are in engagement.

13. A multiple spindle milling machine comprising in combination, a base, a rotatable turret thereon, a plurality of parallel work holding spindles rotatably mounted therein, means to rotate each of said spindles when in operative position on said machine, means to lock said spindles against rotation when in their inoperative positions, chucks on the forward ends of said spindles, automatically operated means to tighten said chucks when said spindles are in one of their inoperative positions and when the locking means for said spindles are in operation, and means to withdraw said spindle locking means when the spindles come into operative position.

14. A multiple spindle milling machine comprising in combination, a base, a rotatable turret thereon, a plurality of work holding spindles rotatably mounted therein, means to rotate said spindles when in their operative position, chucks on the forward ends of said spindles, an automatically operated pawl fixed to the frame of the machine to loosen said chucks while said spindles are rotating in their operative positions, and means to move said pawl into and out of spindle engaging position.

15. A multiple spindle milling machine comprising in combination, a base, a rotatable turret thereon, a plurality of work holding spindles rotatably mounted therein, means to rotate said spindles when in their operative position, chucks on the forward ends of said spindles, and automatically operated means to loosen said chucks while said spindles are rotating in their operative positions, said means comprising a pawl engaging ratchet wheels on said spindles.

16. A multiple spindle milling machine comprising in combination, a base, a rotatable turret thereon, a plurality of work holding spindles rotatable mounted therein, means to rotate said spindles when in their operative position, chucks on the forward ends of said spindles, an automatically operated pawl fixed to the frame of the machine to engage said chucks while said spindles are rotating and before said spindles move away from their operative positions whereby said chucks are loosened by rotation of said spindles, and mechanical means to move said pawl into and out of operative position.

17. A milling machine comprising in combination, a base, a rotatable turret thereon, a plurality of work supporting spindles rotatably mounted in said turret, means to rotate said turret, and means to rotate said spindles when in operative position on said machine, said spindle rotating means being engaged and disengaged respectively as each spindle moves into and out of operative position and adapted to rotate said spindles more than one revolution while in operative position and be disengaged from said spindle before a second revolution is completed.

18. A milling machine comprising in combination, a base, a rotatable turret thereon, a plurality of work supporting spindles rotatably mounted in said turret, means to rotate said turret, means to rotate said spindles when in operative position on said machine, a cutter adapted to operate on work rotated by said spindles, a cam shaft controlling movements of said cutter, said spindle rotating means being also driven from said shaft and being engaged and disengaged respectively as each spindle moves into and out of operative position and rotating said spindles more than one revolution while in operative position.

19. A milling machine comprising in combination, a base, a rotatable turret thereon, a plurality of work supporting spindles rotatably mounted in said turret, a milling cutter mounted adjacent one end of said spindles, means to move said milling cutter into and out of operative position and to move it in a direction parallel to said spindles, a cam shaft for operating said cutter moving means, and driving means for said spindles operated from rotation of said cam shaft.

20. A milling machine comprising in combination, a base, a rotatable turret thereon, a plurality of work supporting spindles rotatably mounted in said turret, a milling cutter mounted adjacent one end of said spindles, means to move said milling cutter into and out of operative position and to move it in a direction parallel to said spindles, a cam shaft for operating said cutter moving means, and driving means for said spindles operated from rotation of said cam shaft, said driving means being adapted to rotate said spindles one and a fraction revolutions while said cam shaft rotates once.

21. A milling machine comprising in combination, a base, a rotatable turret thereon, a plurality of work supporting spindles rotatably mounted in said turret, a milling cutter mounted adjacent one end of said spindles, means for move said milling cutter into and out of operative position and to move it in a direction parallel to said spindles, a cam shaft for operating said cutter moving means, means to rotate each of said spindles when in operative position on said turret operated from rotation of said cam shaft, said rotating means being adapted to drive said spindles at a higher speed than said cam shaft.

22. A milling machine comprising in combination, a base, a rotatable turret thereon, a plurality of work supporting spindles rotatably mounted in said turret, a milling cutter mounted adjacent one end of said spindles, means to move said milling cutter into and out of operative position and to move it in a direction parallel to said spindles, a cam shaft for operating said cutter moving means, means to rotate each of said spindles when in operative position on said turret, said means being operated from rotation of said cam shaft and engaging a driving member on said spindles to rotate said spindles more than one revolution during one rotation of said cam shaft, and disengaging said spindles before two revolutions have been completed.

23. A milling machine comprising in combination, a base, a rotatable turret thereon, a plurality of work supporting spindles rotatably mounted in said turret, means to rotate said turret, a milling cutter mounted adjacent one end of said spindles, means to move said milling cutter into and out of operative position and to move it in a direction parallel to said spindles, a cam shaft for operating said cutter moving means, means to rotate each of said spindles when in operative position on said machine, said means being operated from rotation of said cam shaft and rotating said spindles more than one revolution while said cam shaft rotates once and disengaging said spindles as they move away from operative position during the rotative movement of said turret.

24. A cutter support for milling machines comprising in combination, a slide, a second slide mounted on said first slide and movable transversely thereto, a cutter rotatably mounted thereon, cam operated means to move said second slide a predetermined distance relative to said first slide, a screw and nut construction to adjust the position of said second slide relative to said first slide, and manual means to limit the rotation of said nut to a predetermined definite amount.

25. A cutter support for milling machines having a plurality of parallel work holding spindles adapted to be indexed into operative position relative to a milling cutter, comprising in combination, a slide, a second slide mounted on said first slide and movable transversely thereto, cam operated means to move said second slide into and out of work engaging position against means resiliently forcing it out of work engaging position, a screw splined to said second slide and bearing against said cam operated means, a nut thereon, and means to limit the adjustment of said nut on said screw to a predetermined fixed amount.

26. A cutter support for milling machines having a plurality of parallel work holding spindles adapted to be indexed into operative position relative to a milling cutter, comprising in combination, a slide, a second slide mounted on said first slide and movable transversely thereto, cam operated means to move said second slide into and out of work engaging position against means resiliently forcing it out of work engaging position, a screw splined to said second slide and bearing against said cam operated means, a nut thereon, means to adjust the position of said nut on said screw a predetermined fixed distance, and means permitting adjustment of said nut a distance greater than said predetermined distance.

27. A cutter support for milling machines having a plurality of parallel work holding spindles adapted to be indexed into operative position relative to a milling cutter, comprising in combination, a slide, a second slide mounted on said first slide and movable transversely thereto, cam operated means to move said second slide into and out of work engaging position, springs resiliently forcing said second slide out of work engaging position, a screw splined to said second slide and bearing against said cam operated means, a nut thereon, and means independent of said cam operated means to adjust the position of said second slide toward or away from work engaging position.

28. A milling machine comprising in combination, a base, a work supporting and rotating spindle thereon, a cutter support slidable on said base toward and from said spindle in a direction parallel to said spindle axis, a second slide mounted on said first slide adapted to move transversely of said first slide, a cutter on said second slide, cam operated means to move said first slide along said base, cam operated means to move said second slide relative to said first slide, and means to oscillate said second cam operated means said slides moving in timed relation to each other.

29. A milling machine comprising in combination, a base, a work supporting and rotating spindle thereon, a cutter support slidable on said base toward and from said spindle in a direction parallel to said spindle axis, a second slide mounted on said first slide adapted to move transversely of said first slide, a cutter on said second slide, cam operated means to move said first slide along said base in timed relation to the rotation of said spindle, cam operated means to move said second slide relative to said first slide to move said cutter into work engaging position and means to oscillate said second cam operated means.

30. A milling machine comprising in combination, a base, a work supporting and rotating spindle thereon, a cutter support slidable on said base toward and from said spindle in a direction parallel to said spindle axis, a second slide mounted on said first slide adapted to move transversely of said first slide, a cutter on said second slide, cam operated means to move said slides along said base, cam operated means to move said second slide relative to said first slide, said slides moving in timed relation to each other, and a cam operating shaft adapted also to drive said spindle in timed relation with said cams.

In testimony whereof, I hereto affix my signature.

JOHN A. DOANE.